(12) United States Patent
Sorenson

(10) Patent No.: US 10,656,348 B2
(45) Date of Patent: May 19, 2020

(54) OPTICAL FIBER CLIP

(71) Applicant: CommScope Technologies LLC, Hickory, NC (US)

(72) Inventor: Lawrence Sorenson, Bloomington, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 45 days.

(21) Appl. No.: 15/821,549

(22) Filed: Nov. 22, 2017

(65) Prior Publication Data

US 2018/0180825 A1 Jun. 28, 2018

Related U.S. Application Data

(60) Provisional application No. 62/438,067, filed on Dec. 22, 2016.

(51) Int. Cl.
| | |
|---|---|
| G02B 6/38 | (2006.01) |
| G02B 6/42 | (2006.01) |
| G02B 6/44 | (2006.01) |
| G02B 6/36 | (2006.01) |

(52) U.S. Cl.
CPC ......... *G02B 6/3898* (2013.01); *G02B 6/3652* (2013.01); *G02B 6/3887* (2013.01); *G02B 6/3897* (2013.01); *G02B 6/4439* (2013.01); *G02B 6/4452* (2013.01); *G02B 6/4459* (2013.01); *G02B 6/4471* (2013.01)

(58) Field of Classification Search
CPC .. G02B 6/3825; G02B 6/3882; G02B 6/3897; G02B 6/4292; G02B 6/3893; G02B 6/3885; G02B 6/3869; G02B 6/3898
See application file for complete search history.

(56) References Cited

U.S. PATENT DOCUMENTS

| | | | | |
|---|---|---|---|---|
| 4,119,285 A * | 10/1978 | Bisping | ..................... | F16L 3/24 248/72 |
| 5,066,095 A * | 11/1991 | Dekeyser | ............. | G02B 6/4428 385/100 |
| 5,093,887 A * | 3/1992 | Witte | ................... | G02B 6/4452 248/51 |
| 5,684,911 A * | 11/1997 | Burgett | ................ | G02B 6/4446 385/135 |
| 6,424,782 B1 * | 7/2002 | Ray | ..................... | G02B 6/4471 385/135 |
| 6,850,687 B2 * | 2/2005 | Lavoie | ................. | G02B 6/4471 385/135 |
| 6,873,779 B1 * | 3/2005 | Sonderegger | ........ | G02B 6/4478 385/136 |
| 7,393,148 B2 * | 7/2008 | Allen | ................... | G02B 6/3801 385/95 |

(Continued)

*Primary Examiner* — Ryan A Lepisto
*Assistant Examiner* — Erin D Chiem
(74) *Attorney, Agent, or Firm* — Merchant & Gould P.C.

(57) ABSTRACT

An optical fiber clip comprises a body portion. The body portion has a flexible architecture providing flexibility between an un-flexed position and a flexed position. The body portion includes a channel there through. The channel narrows at first and second ends of the channel. The narrowed first and second ends of the channel are configured to establish an interference fit with an optical fiber received therein when the body portion is in the un-flexed position and to release the interference fit when the body portion is in the flexed position.

15 Claims, 5 Drawing Sheets

(56) References Cited

U.S. PATENT DOCUMENTS

| | | | |
|---|---|---|---|
| 8,295,669 B2* | 10/2012 | Park | G02B 6/3806 385/135 |
| 8,596,884 B2* | 12/2013 | Barnes | G02B 6/3887 385/76 |
| 8,676,018 B2* | 3/2014 | Barnes | G02B 6/245 30/90.1 |
| 2002/0131750 A1* | 9/2002 | Holman | G02B 6/4452 385/136 |
| 2003/0235387 A1* | 12/2003 | Dufour | G02B 6/4471 385/136 |
| 2007/0104448 A1* | 5/2007 | Allen | G02B 6/4471 385/135 |
| 2012/0027361 A1* | 2/2012 | Brower | G02B 6/4471 385/89 |
| 2012/0180298 A1* | 7/2012 | Castonguay | G02B 6/3846 29/434 |
| 2013/0121656 A1* | 5/2013 | Chen | G02B 6/4471 385/135 |
| 2018/0275351 A1* | 9/2018 | Parikh | G02B 6/3887 |

* cited by examiner

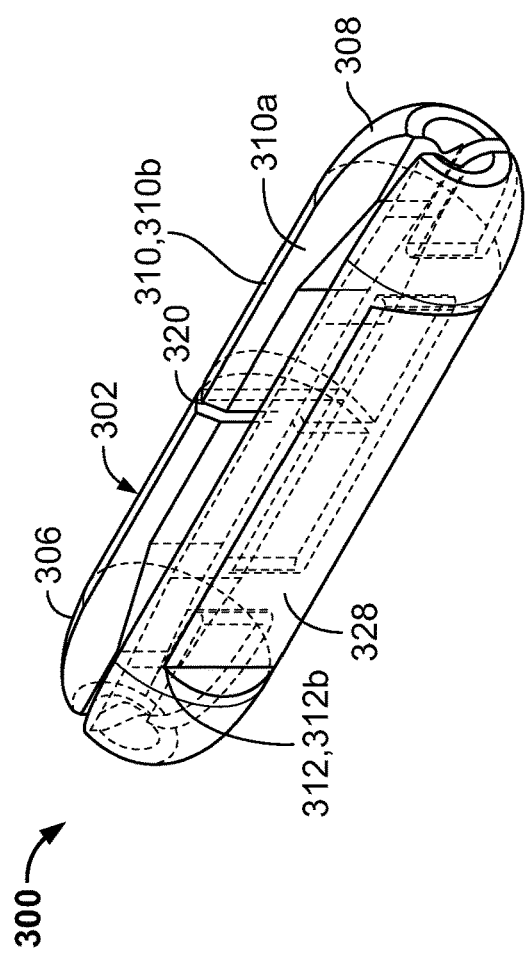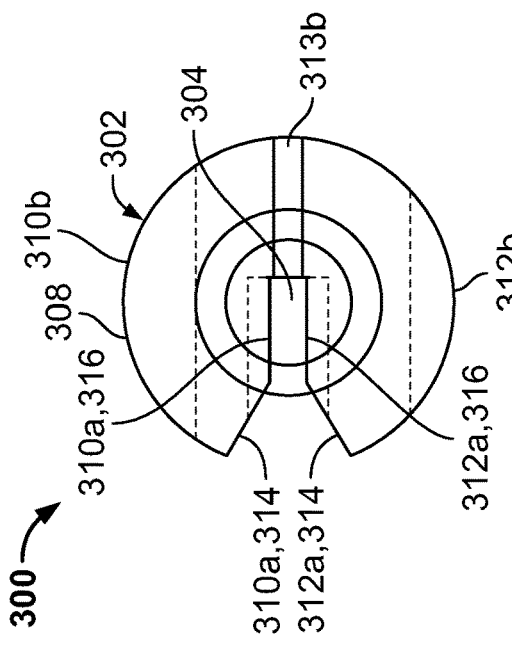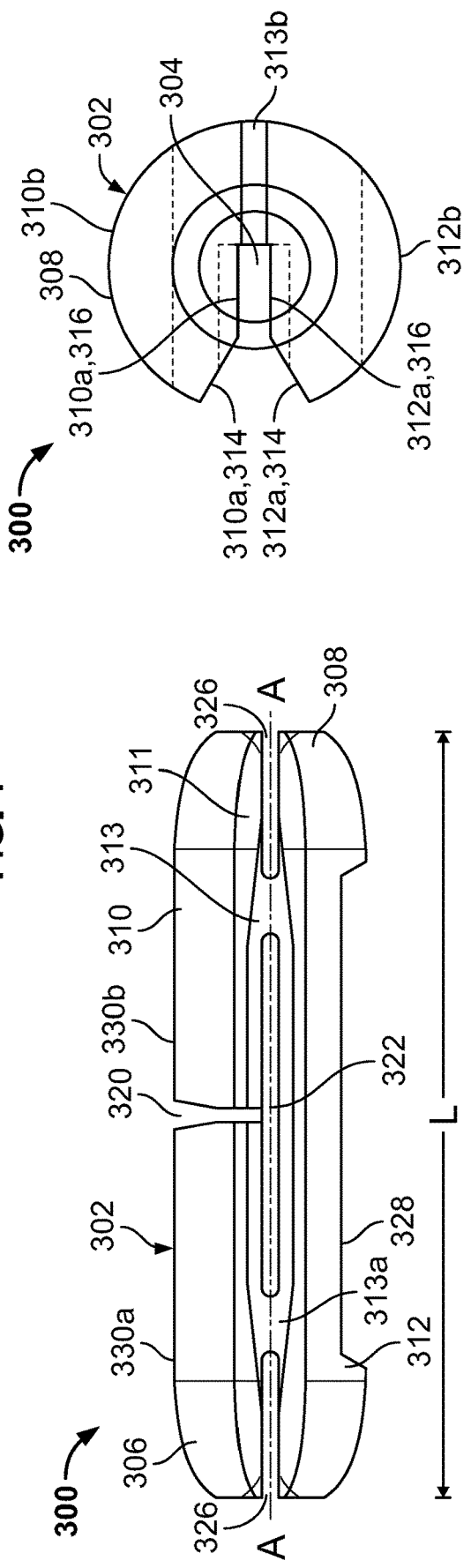

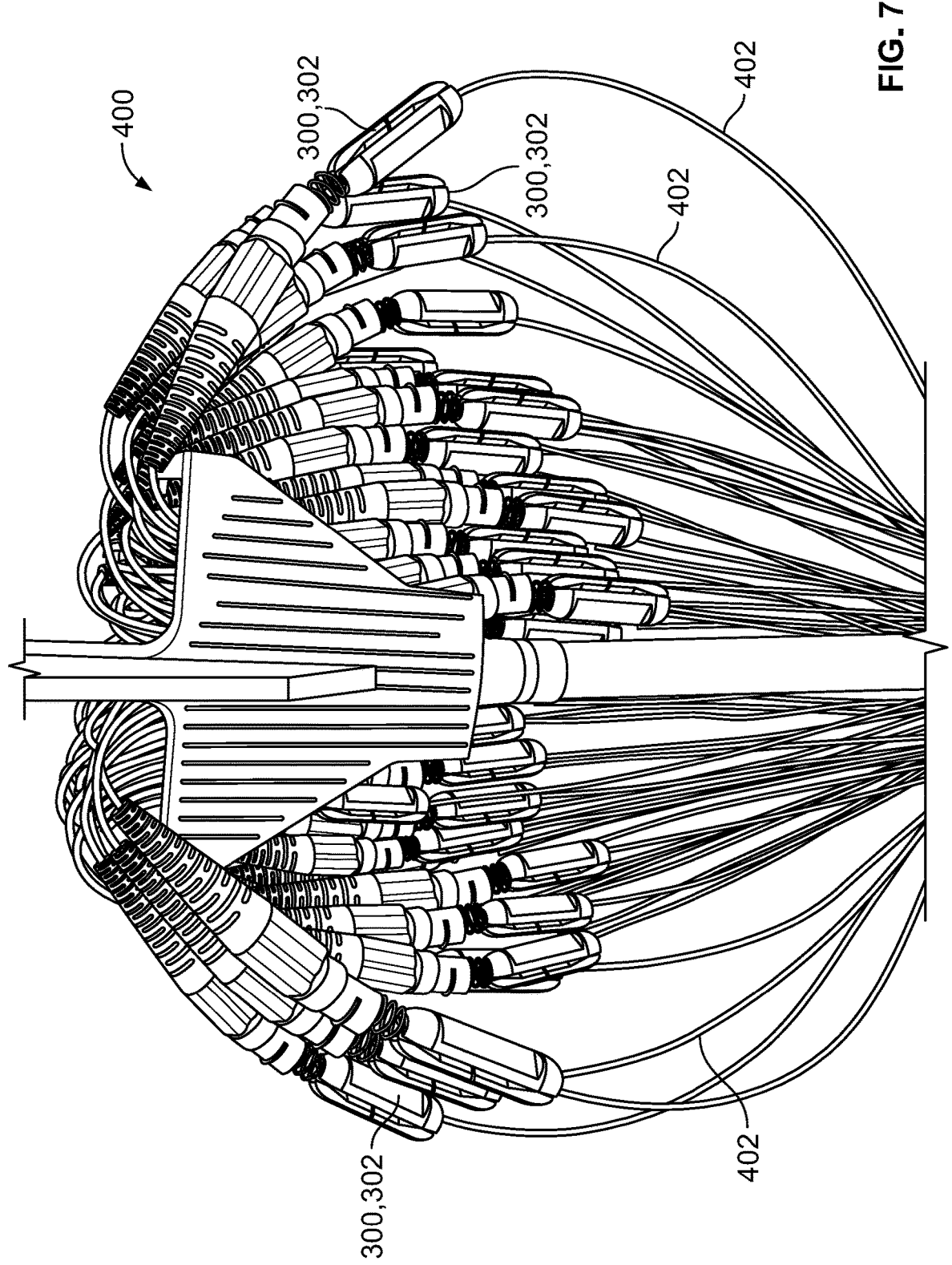

OPTICAL FIBER CLIP

TECHNICAL FIELD

The present disclosure is directed to the connectorization of optical fibers and, more particularly, to an optical fiber clip for component retention in the connectorization of optical fibers.

BACKGROUND

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be optically connected without requiring a splice. Fiber optic connectors can be used to optically interconnect two lengths of optical fiber. Fiber optic connectors can also be used to interconnect lengths of optical fiber to passive and active equipment.

A typical fiber optic connector, for example an LC connector, includes a housing having a plug body, a rear body and a boot, as well as a ferrule assembly supported at a distal end of the connector housing and a spring that is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. Various other fiber optic connectors, e.g., SC or MPO, include different housings and components. Regardless of the connector used, the process of connectorizingk, or securing the connector to the end of the optical fiber, is often a manual process requiring the threading of connector components onto an optical fiber prior to the cleaving and/or polishing the end of the optical fiber. After threading of the connector components onto the optical fiber, the components are typically held in place to prevent their sliding off the fiber or covering the end of the fiber. The means for holding the connector components in place typically comprises a piece of tape that is wrapped about the fiber. While tape is capable of performing the function of retaining the connector components on the optical fiber, it is difficult and time-consuming to remove, can leave adhesive behind on a jacket of the optical fiber, and can cause tangling in the instance of connectorizing the ends of a plurality of optical fibers in multi-fiber cable.

SUMMARY

The present disclosure is directed to a fiber optic clip for retaining connector components during the finishing process, e.g., cleaving, polishing, connectorizing, etc., of an optical fiber. The fiber optic clip is a reusable device that can be secured and removed from an optical fiber during one or more finishing processes.

One aspect of the present disclosure is directed to an optical fiber clip comprising a body portion. The body portion has a flexible architecture providing flexibility between an un-flexed position and a flexed position. The body portion includes a channel there through. The channel narrows at first and second ends of the channel. The narrowed first and second ends of the channel are configured to establish an interference fit with an optical fiber received therein when the body portion is in the un-flexed position and to release the interference fit when the body portion is in the flexed position.

Another aspect of the present disclosure is directed to a method connectorizing an optical fiber comprising the steps of: (a) threading a component of an optical fiber connector onto an optical fiber; (b) placing an optical fiber clip onto the optical fiber in a position to retain the threaded component on the optical fiber; (c) finishing an end of an optical fiber while the threaded components are retained on the optical fiber by the optical fiber clip; (d) removing the optical fiber clip by flexing the flexible, body portion of the optical fiber clip to release the interference fit after finishing the end of the optical fiber; and (e) completing assembly of the optical fiber connector, including sliding the threaded components proximate to finished end of the optical fiber. The optical fiber clip includes a flexible, body portion having a channel there through. The channel narrows at first and second ends of the flexible, body portion to establish an interference fit with the optical fiber within the channel.

Another aspect of the present disclosure is directed to an optical fiber clip that includes a body portion having first and second ends as well as first and second side wall that extend between the first and second ends. The first and second side walls are joined along a common floor extending between the first and second ends. The common floor and first and second side wall define a channel within the body portion. The channel extends between the first and second ends of the body portion and narrows at the first and second ends. The narrowed first and second ends of the channel are configured to establish a releasable interference fit with an optical fiber received in the channel.

The summary above is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 4 is a perspective view of the fiber optic clip.

FIG. 5 is a top view of the fiber optic clip.

FIG. 6 is an end view of the fiber optic clip.

FIG. 7 is a schematic of a multi-fiber cable with each of the optical fibers being connectorized using the fiber optic clip for holding connector components in position.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The fiber optic clip of the present disclosure is a reusable device that is configured for quick coupling to and quick removal from an optical fiber. Upon being coupled to the optical fiber, the fiber optic clip is configured to retain optical fiber connector components that are present on the optical fiber to enable placement of a ferrule about the optical fiber and/or enable the cleaving, polishing or cleaning of the optical fiber before final assembly of the optical fiber connector.

Figure 1:
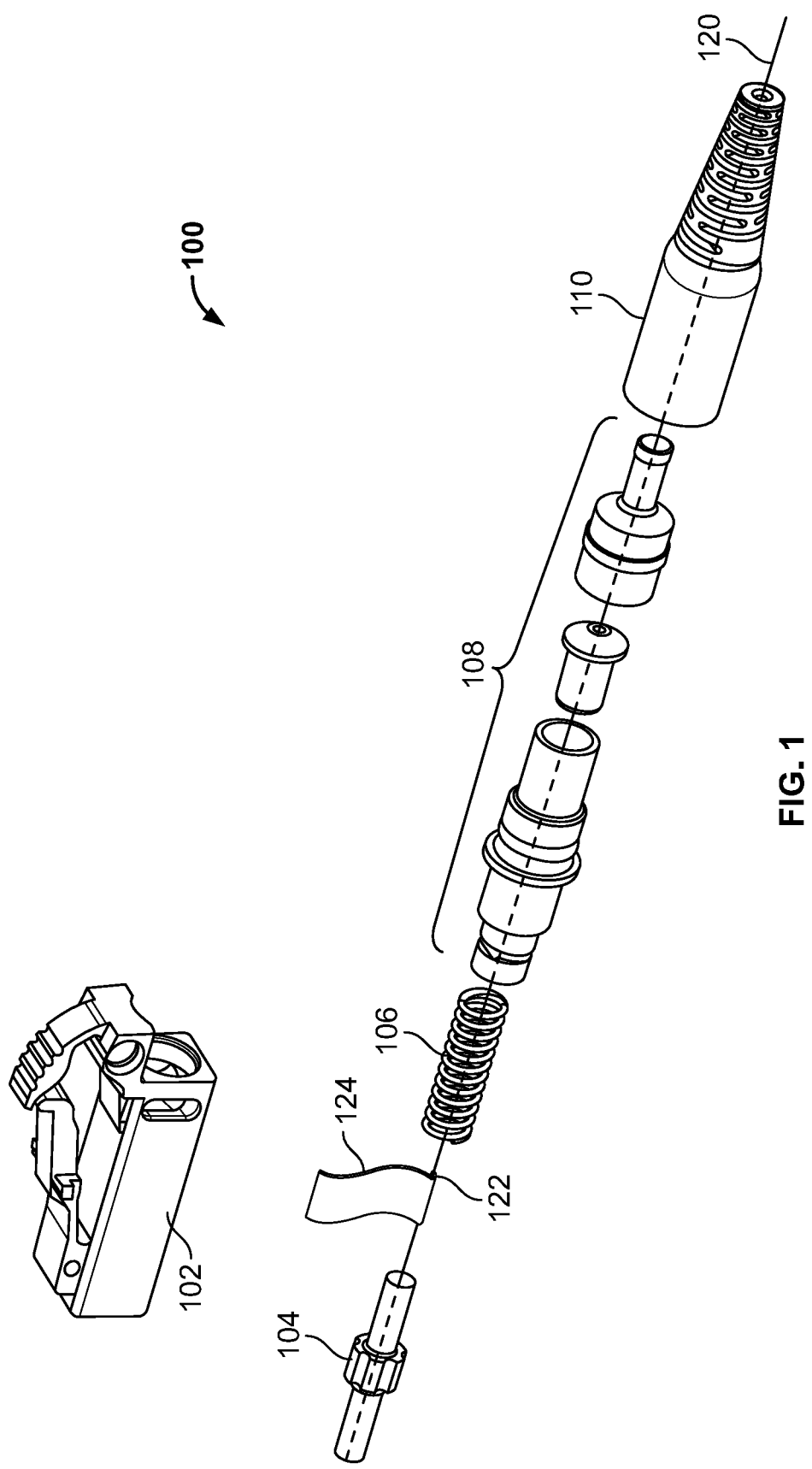
FIG. 1 is a perspective view of components of a fiber optic connector threaded onto an optical fiber and held in position with tape.

Referring to FIG. 1, a typical assemble of an exemplary LC connector 100 is illustrated. In this illustration, the LC connector 100 generally comprises a plug body 102, a ferrule 104, a biasing spring 106, a rear body 108 and a boot 110. In preparing an optical fiber 120 for finishing the boot 110, rear body 108, and biasing spring 106 are threaded onto the optical fiber 120 and temporarily secured in place by the wrapping of a piece of tape 124 about a jacket 122 of the optical fiber 120. With the tape in position, the ferrule 104 can be secured in place about the optical fiber 120 and the end of the optical fiber 120 can be finished with appropriate cleaving, polishing or cleaning. Upon finishing the optical fiber 120, the tape 124 is removed and the threaded components of the LC connector 100 are slid down the optical fiber 120 proximate the ferrule, and inserted into the plug body 102 for final connector assembly.

Figure 2:
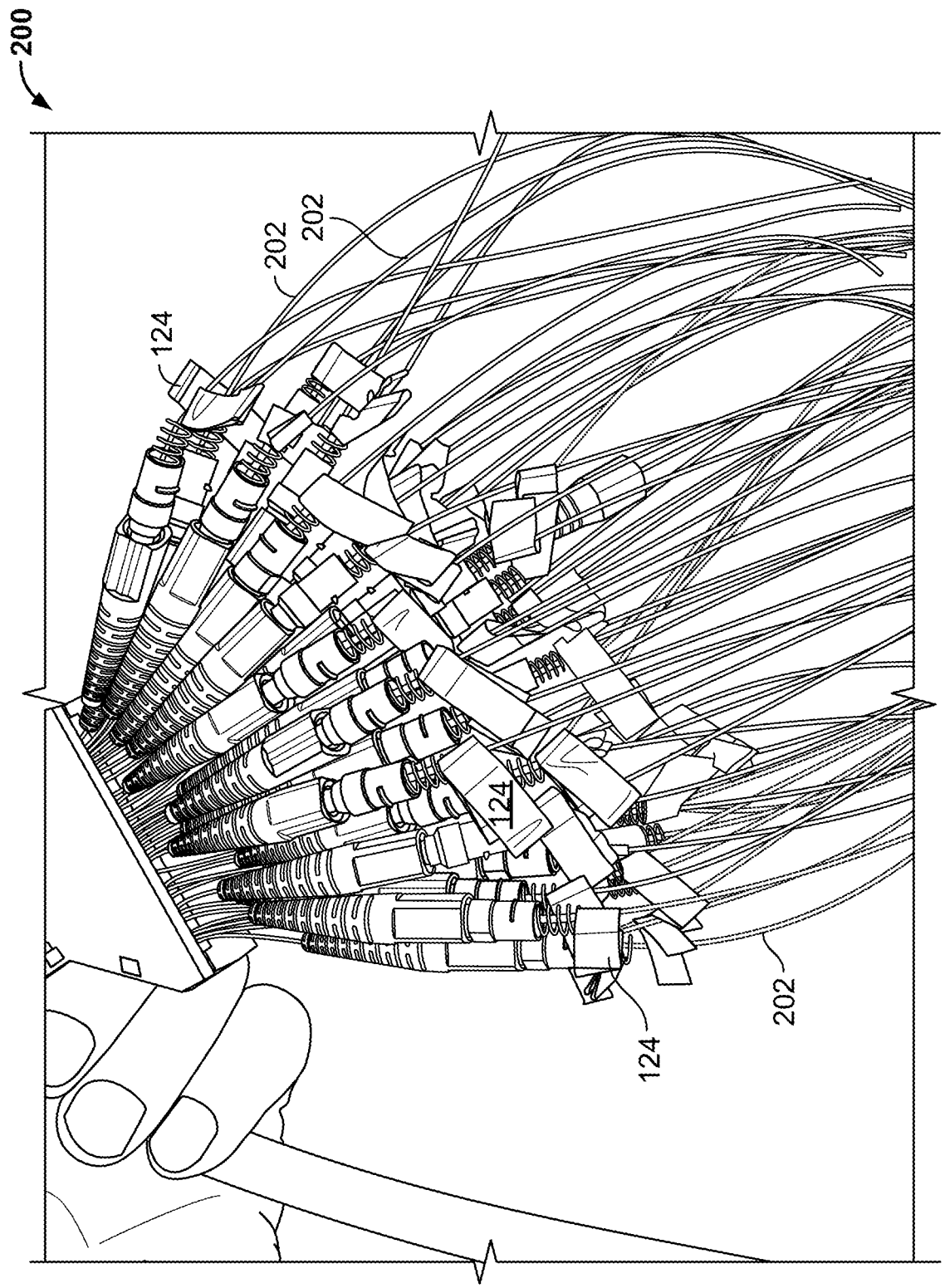
FIG. 2 is a schematic of a multi-fiber cable with each of the optical fibers being connectorized using tape for holding connector components in position.

While the tape 124 does perform the function of retaining the connector components on the optical fiber 120, the tape 124 is difficult and time-consuming to remove, can leave adhesive behind on the jacket 122 of the optical fiber 120, and can cause tangling among pluralities of fibers. See for example the multi-fiber cable 200 of FIG. 2 where each of the fibers 202 in the multi-fiber cable 200 is prepared for connectorization in immediate proximity to the other fibers 202. Notably the tape 124 portion about the fiber 202 has a minimal circumference, just slightly larger than the fiber 202 itself. Accordingly, the tape 124 does little to nothing to help spread apart and provide spacing between the fibers 202. Rather the tape 124 allows undesirable tangling of the fibers 202.

Figure 3:
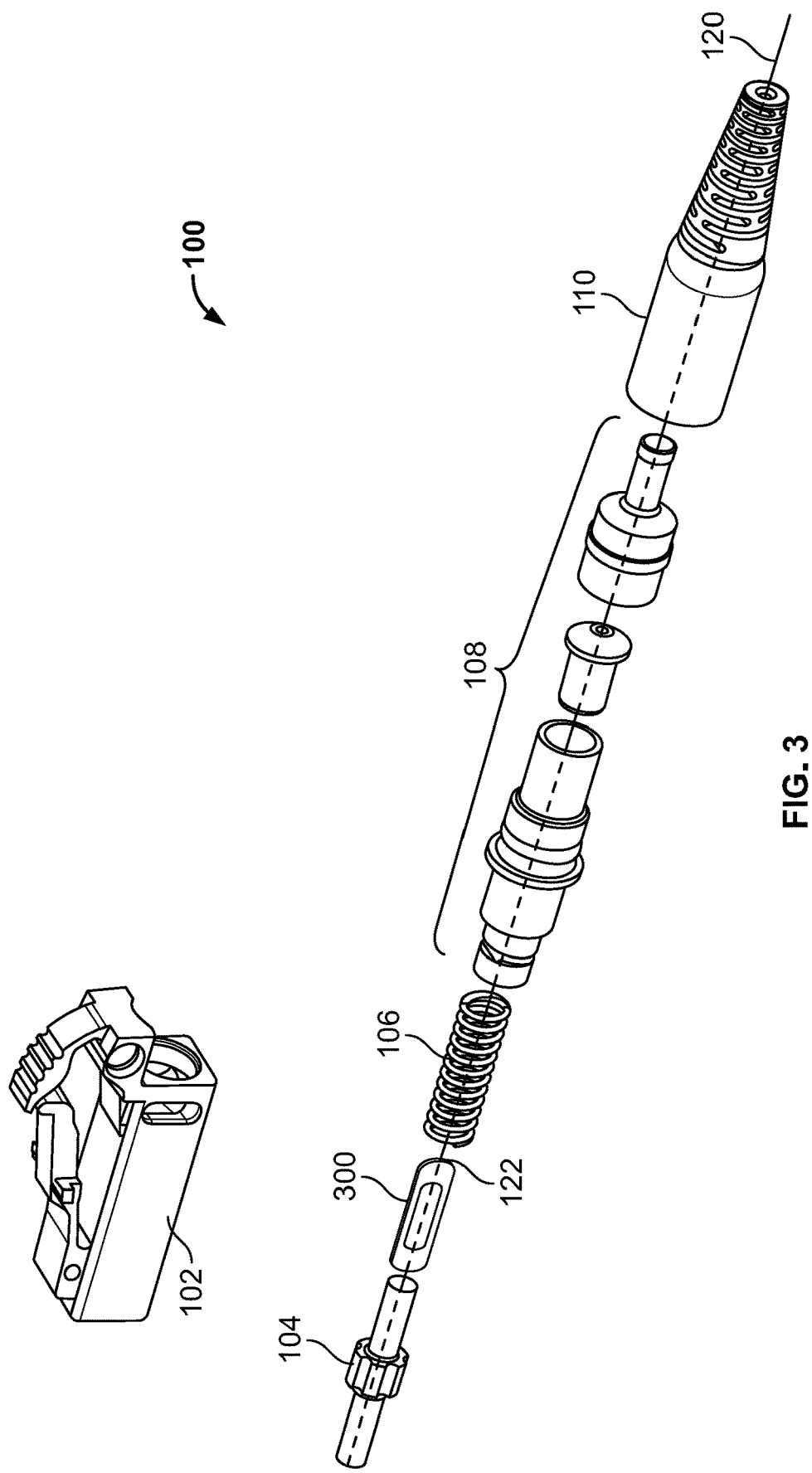
FIG. 3 is a perspective view of components of a fiber connector threaded onto an optical fiber and held in position with fiber optic clip according to the present disclosure.

Referring to FIG. 3, the optical fiber clip 300 of the present disclosure is illustrated with the exemplary LC connector 100 of FIG. 1. As shown, the optical fiber clip 300 operates to retain the biasing spring 106, the rear body 108 and the boot 110 that have been threaded onto the optical fiber 120. However, the optical fiber clip 300 can be used to retain any number and combination of components as suitable or necessary. FIGS. 4-6 provide additional detail regarding the optical fiber clip 300. The optical fiber clip 300 generally comprises a body portion 302 that can be manufactured through molding or other appropriate techniques. In certain examples, the body portion 302 is approximately one inch long and approximately one-quarter in diameter; the body portion 302 may be defined by other lengths and diameters sufficient to maintain components on the optical fiber 120 without departing from the spirit or scope of the invention. In certain examples, the optical fiber clip 300 is of a unitary construction while in other examples the optical fiber clip 300 comprises an assembly of two or more components.

The body portion 302 of the optical fiber clip 300 includes a channel 304 that extends along a length L of the body portion from a first end 306 of the optical fiber clip 300 to a second end 308. The central opening 309 to the channel 304 is defined by a first side wall 310, having an inner surface 310a and an outer surface 310b, and a second side wall 312, having an inner surface 312a and an outer surface 312b. The first and second side walls 310, 312 are joined at a common floor 313 having an inner surface 313a and an outer surface 313b.

A first portion 314 of each of the inner surfaces 310a, 312a of the first and second side walls 310, 312 includes a chamfered edge for easy insertion of the optical fiber into the channel 304. A second portion 316 of each of the inner surfaces 310a, 312a along with the inner surface 313a of the common floor 313 are shaped to provide the channel 304 with sufficient space to accommodate the diameter of an optical fiber, e.g., optical fiber 120. The space within the channel 304 narrows, or decreases, at each of the first and second ends 306, 308 to a dimension capable of establishing an interference fit with an inserted optical fiber; the interference fit with the optical fiber allows the optical fiber clip 300 to remain on the fiber and retain threaded components without slipping of the optical fiber clip 300 and without damaging the optical fiber. A central portion of the channel 304 intermediate the first and second ends 306, 308 provides a loose, or non-interference fit about the inserted optical fiber.

The outer surfaces 310b, 312b of each of the first and second side walls 310, 312 is arcuate and establishes the optical fiber clip 300 with a generally round profile, however, the outer surfaces 310b, 312b can have other configurations that provide the optical fiber clip 300 with alternative profiles, e.g., rectangular, triangular, etc., without departing from the spirit of scope of the invention. The first side wall 310 is provided with a centrally positioned slot 320 that generally extends through the first side wall 310 and presents perpendicularly to an elongate axis A of the channel 304. The centrally positioned slot 320 interfaces with an elongate slot 322 within the channel 304 that extends through the common floor 313 of the channel 304; the elongate slot 322 is generally parallel to axis A. An end slot 326 within the channel 304 at each of the first and second ends 306, 308 also extends through the common floor 313. The interfacing slots, e.g., centrally positioned slot 320 and elongate slot 322, in conjunction with the end slots 326 at the first and second ends 306, 308 establish a flexible architecture for the optical fiber clip 300.

The outer surface 312b of the second side wall 312 of the optical fiber clip 300 is provided with a recess 328 having a profile different from the overall profile the optical fiber clip 300. In the illustrated example, the recess 328 has rectangular profile. The recess 328 is located opposite the centrally positioned slot 320 and serves as an easily touch-identifiable location for placement of a user's grasping thumb or finger. The user's thumb or other fingers can be placed to one or both sides 330a, 330b of the centrally positioned slot 320 to create a single-handed, thumb and finger holding grasp of the optical fiber clip 300.

In use, the optical fiber clip 300 can be grasped in a first hand while a second hand places the optical fiber, e.g., optical fiber 120, over the channel 304. A tug on the optical fiber at either or both of the first and second ends 306, 308 of the optical fiber clip 300 results in the fiber being pulled down into the channel 304 where the interference fit at the narrowed first and second ends 306, 308 of the channel 304 holds the optical fiber clip 300 in place and prevents it from sliding on the fiber. The optical fiber clip 300 provides an outer dimension sufficient to retain the various components previously threaded onto the fiber.

To release the fiber from the optical fiber clip 300, the user can place their thumb/finger in the recess and a thumb/finger at the centrally positioned slot 320 and, squeeze towards one another. The centralized squeezing action at the optical fiber clip 300 causes the first and second ends 306, 308 of the channel 304 to flare outward releasing the interference fit and, ultimately, releasing the optical fiber from the channel 304. The optical fiber clip 300 clip can be re-used any number of times, leaves no residue, and is fairly inexpensive to manufacture.

The optical fiber clip 300 is especially useful in the connectorization of a multi-fiber cable. In certain examples, the multi-fiber cable can include 2 or more fibers. In certain examples, the multi-fiber cable can include 12 or more fibers. In certain examples, the multi-fiber cable can include 24 or more fibers. In certain examples, the multi-fiber cable can include 36 or more fibers. In certain examples, the multi-fiber cable can include 48 or more fibers. In certain examples, the multi-fiber cable can include 60 or more fibers. In certain examples, the multi-fiber cable can include 72 or more fibers.

FIG. 7 illustrates a multi-fiber cable 400 in which each of the fibers 402 is prepared for connectorization through use of the optical fiber clip 300. As shown, the body 302 of the optical fiber clip 300 is of a sufficient width/dimension to establish a space or separation for each of the fibers 402 thereby preventing tangling. Fibers which are easily accessible and separate from one another serve to reduce the time required for fiber connectorization.

While the fiber optic clip has been described above in reference to an LC connector it should be noted that the fiber optic clip can be used in any type of fiber optic preparation or process where it is necessary to temporarily maintain the position of any type of component threaded onto an optical fiber. Further the fiber optic clip need not be used only to temporarily maintain components but can be used as a tool for grasping a single fiber to quickly and easily separate it from other fibers. The fiber optic clip can be used with both ferrule and ferrule-less fibers.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed:

1. An optical fiber clip, comprising:
  an elongate body portion having a flexible architecture providing flexibility between an un-flexed position and a flexed position,
  the elongate body portion including first and second side walls that define an open-top, open-ended channel extending along an elongate axis of the body portion, the first and second side walls joining to define a bottom surface of the body portion and to present a first and second end of the body portion,
  the elongate body portion further including an elongate slot positioned intermediate the first and second ends and extending from the channel through the bottom surface,
  the elongate body portion further including a centrally positioned slot that extends through the first side wall, the centrally positioned slot being perpendicular to the elongate axis, the centrally positioned slot interfacing with the elongate slot,
  the channel of the elongate body portion narrowing at the first and second ends to establish an interference fit with a single continuous optical fiber received therein when the body portion is in the un-flexed position and to release the interference fit when the body portion is in the flexed position.

2. The optical fiber clip of claim 1, wherein the flexible architecture comprises a plurality of slots that extend from the channel through the body portion.

3. The optical fiber clip of claim 2, wherein the plurality of slots include first and second end slots at the first and second ends of the channel.

4. The optical fiber clip of claim 3, wherein the flexed position enables the first and second end slots to widen the channel at the first and second ends to release the interference fit.

5. The optical fiber clip of claim 1, wherein the body portion includes a finger-positioning recess at an outer surface of the unitary body portion.

6. The optical fiber clip of claim 1, comprising a reusable optical fiber clip.

7. The optical fiber clip of claim 1, wherein the body portion comprises a body portion of unitary construction.

8. An optical fiber clip comprising:
  an elongate body portion having first and second ends, and having first and second side walls extending between the first and second ends, the first and second side walls joined along a common floor extending between the first and second ends,
  wherein the common floor and the first and second side walls define a channel along an elongate axis and within the elongate body portion, the channel extending between the first and second ends of the elongate body portion and the channel narrowing at the first and second ends of the elongate body portion,
  the elongate body portion including interfacing, perpendicularly-oriented first and second slots extending through the first side wall and the common floor, respectively,
  wherein the narrowed first and second ends of the channel establish a releasable interference fit with a single continuous optical fiber received within the channel.

9. The optical fiber clip of claim 8, wherein the releasable interference fit is released by a manually-induced flexing of the body portion.

10. The optical fiber clip of claim 8, wherein the body portion includes a flexible architecture.

11. The optical fiber clip of claim 10, wherein the flexible architecture comprises a plurality of slots that extend from the channel through the body portion.

12. The optical fiber clip of claim 11, wherein the plurality of slots include first and second end slots extending from the channel through the common floor at the first and second ends of the body portion.

13. The optical fiber clip of claim 8 wherein the first slot is centrally positioned in the first side wall.

14. The optical fiber clip of claim 13, wherein the second side wall includes a recess positioned opposite the first slot in the first side wall.

15. The optical fiber clip of claim 14, wherein the recess comprises a finger-positioning recess in an outside surface of the second side wall.

* * * * *